July 4, 1950 — O. G. NELSON ET AL — 2,513,815
DISTRIBUTOR MECHANISM
Filed Jan. 8, 1947 — 9 Sheets-Sheet 1

INVENTORS
O. G. NELSON
P. R. POWELL
BY
ATTORNEY

July 4, 1950　　　O. G. NELSON ET AL　　　2,513,815
DISTRIBUTOR MECHANISM

Filed Jan. 8, 1947　　　　　　　　　　　　9 Sheets-Sheet 2

INVENTORS
O. G. NELSON
P. R. POWELL
BY
ATTORNEY

July 4, 1950

O. G. NELSON ET AL 2,513,815

DISTRIBUTOR MECHANISM

Filed Jan. 8, 1947

INVENTORS
O. G. NELSON
P. R. POWELL
BY
ATTORNEY

July 4, 1950
O. G. NELSON ET AL
2,513,815
DISTRIBUTOR MECHANISM
Filed Jan. 8, 1947
9 Sheets-Sheet 4
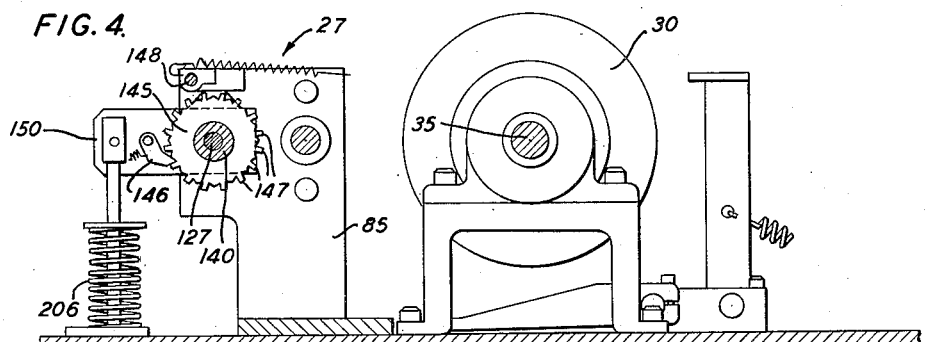
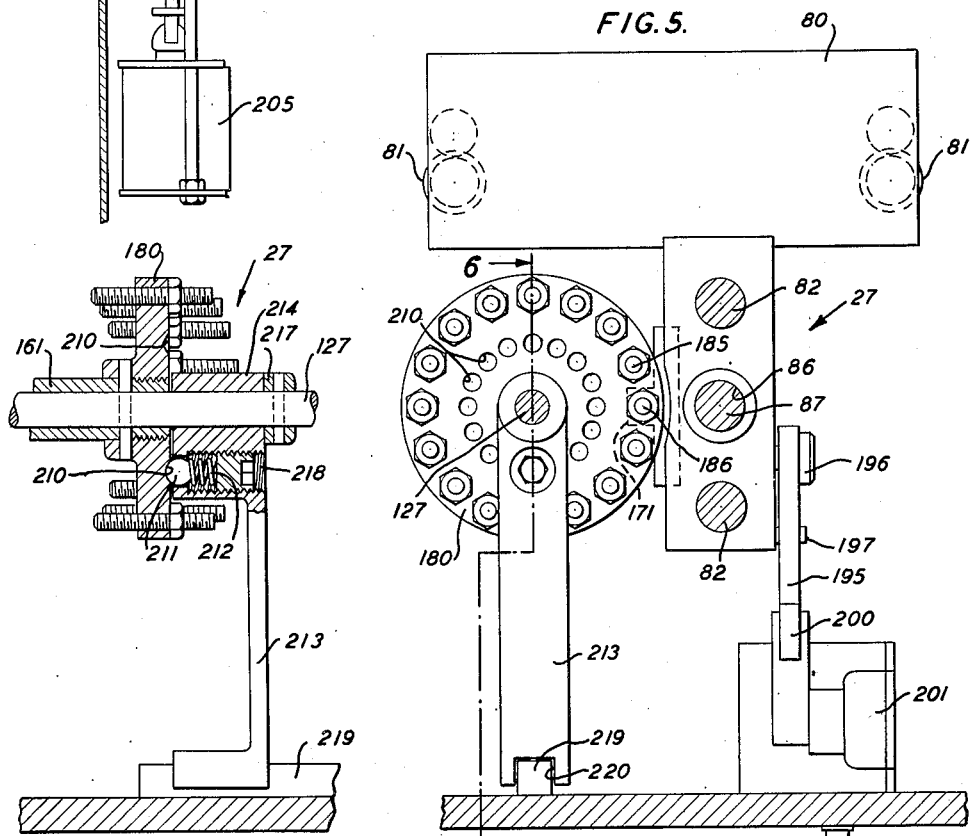
INVENTORS
O. G. NELSON
P. R. POWELL
BY
ATTORNEY

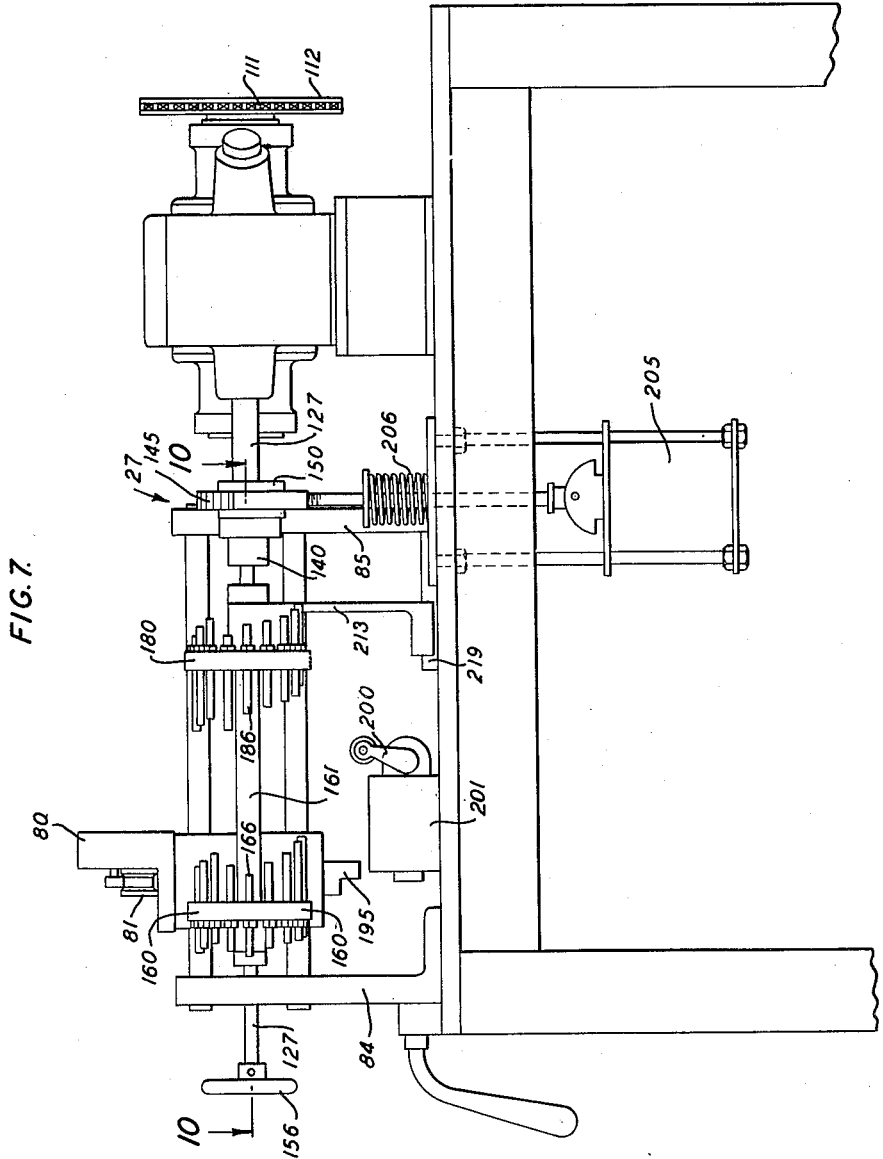

July 4, 1950     O. G. NELSON ET AL     2,513,815
DISTRIBUTOR MECHANISM
Filed Jan. 8, 1947     9 Sheets-Sheet 6
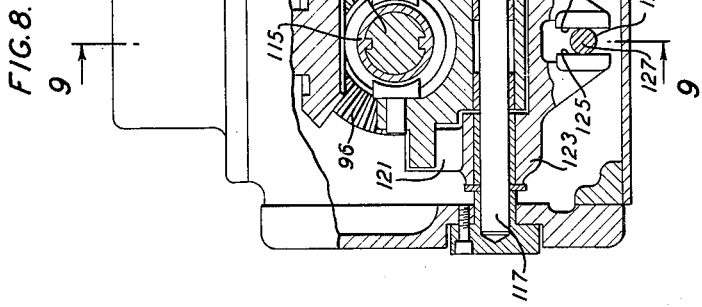
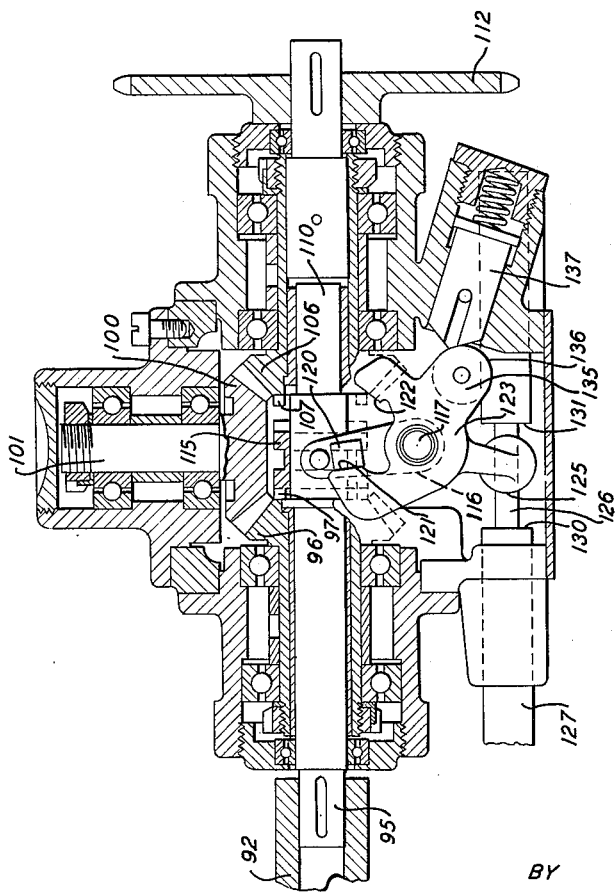
INVENTORS
O. G. NELSON
P. R. POWELL
BY
ATTORNEY

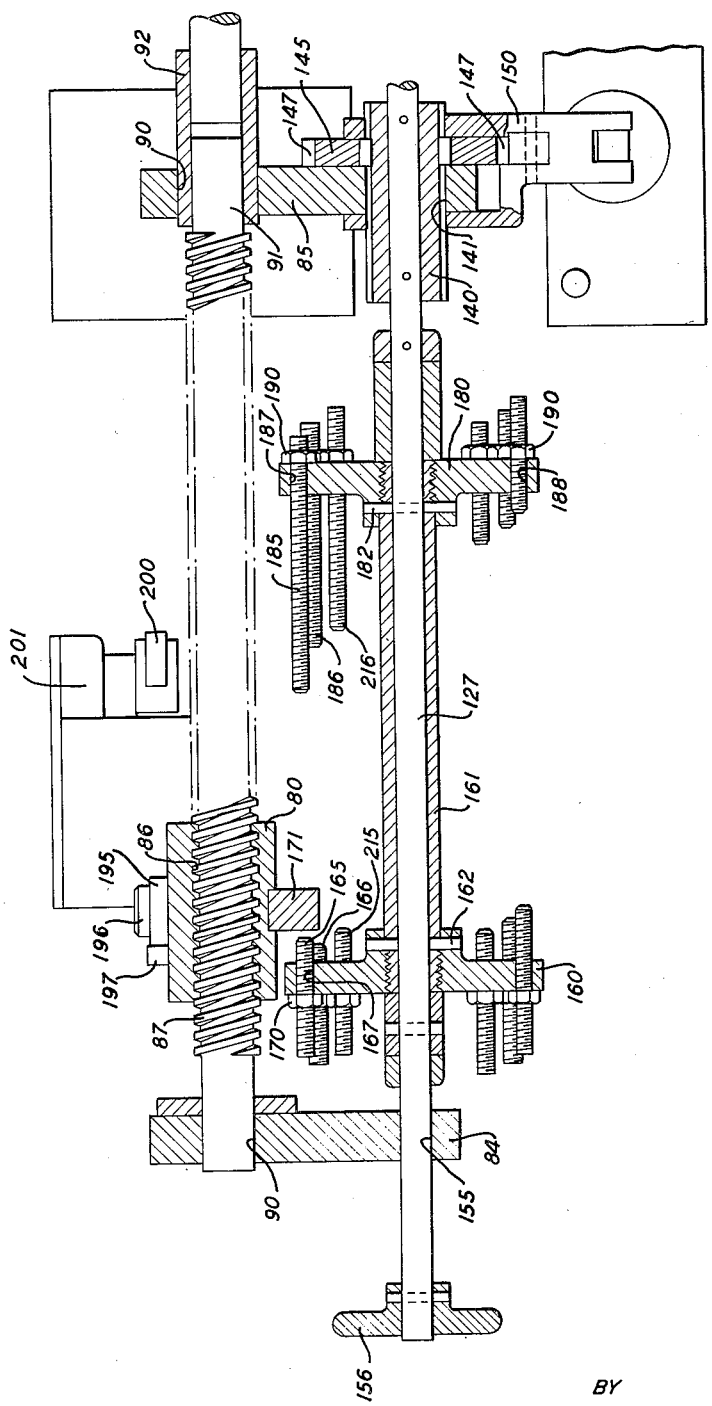

July 4, 1950  O. G. NELSON ET AL  2,513,815
DISTRIBUTOR MECHANISM
Filed Jan. 8, 1947  9 Sheets-Sheet 8
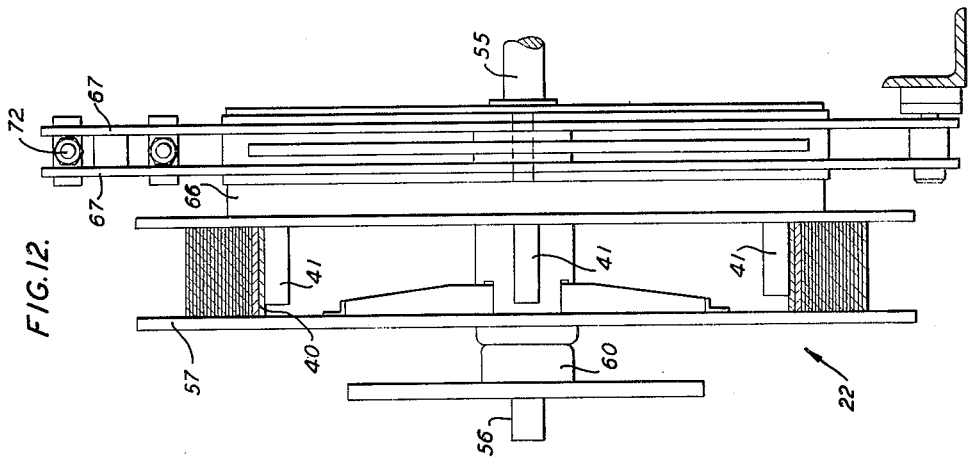
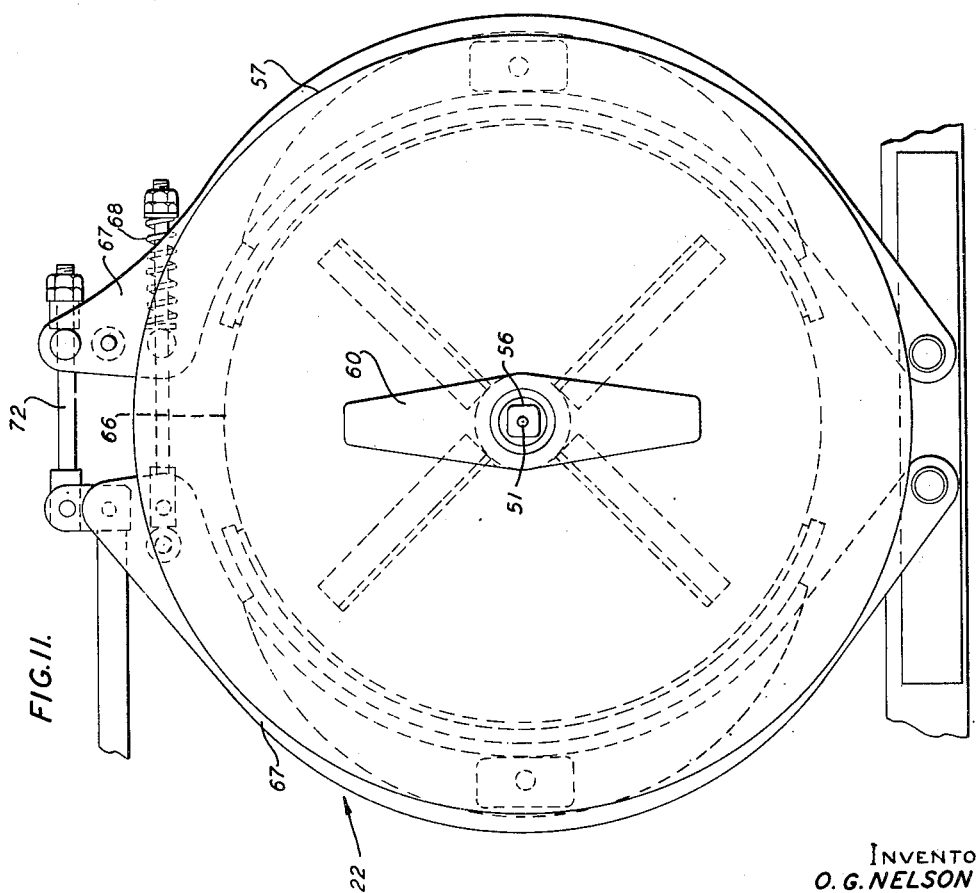
INVENTORS
O. G. NELSON
P. R. POWELL
BY
ATTORNEY

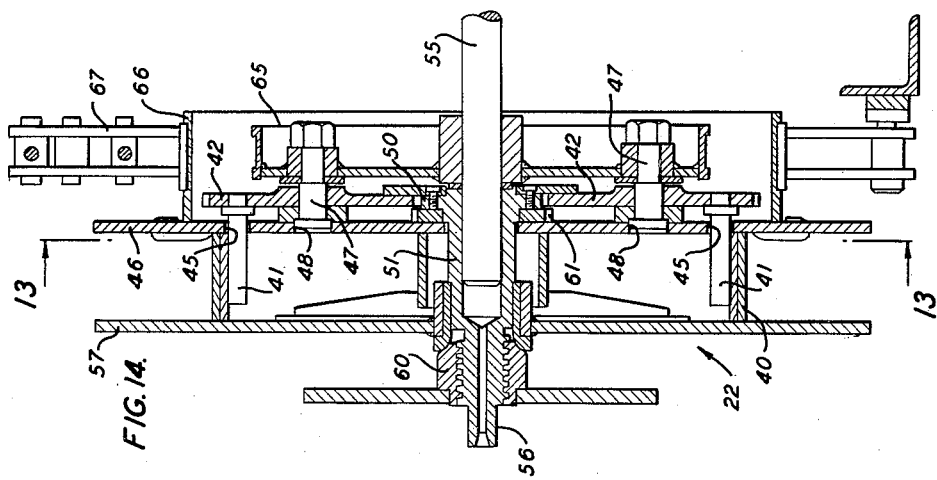
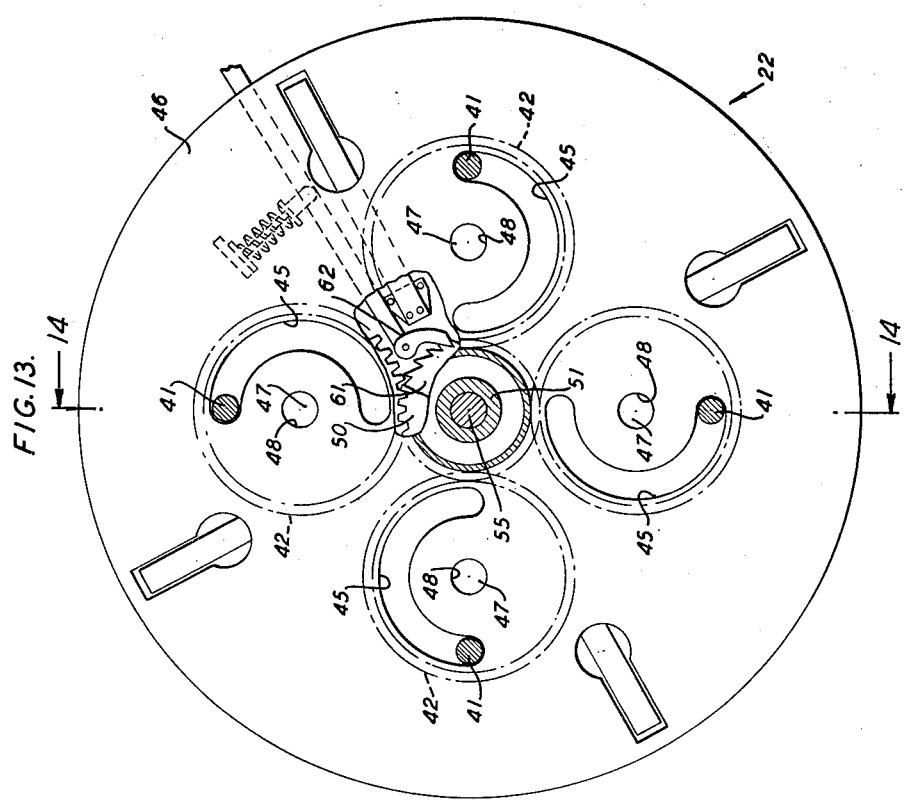

Patented July 4, 1950

2,513,815

UNITED STATES PATENT OFFICE 2,513,815

DISTRIBUTOR MECHANISM

Oscar G. Nelson and Paul R. Powell, Baltimore, Md., assignors to Western Electric Company, Incorporated, New York, N. Y., a corporation of New York Application January 8, 1947, Serial No. 720,834

12 Claims. (Cl. 242—158)

This invention relates to distributor mechanisms, and more particularly to variable throw distributors for distributing tapes and the like on reels.

In some manufacturing operations it is necessary to wind tapes upon reels from which the tapes are later unwound. If a tape is not wound in substantially level layers upon a reel, the tape sometimes become snarled as it is unwound from the reel. Usually automatic distributors are used to distribute tapes upon reels as the tapes are wound on the reels. If a distributor having a non-variable throw is used, the tape frequently buckles slightly at the flanges of the reel due to the reversal of pitch and tends to pile up at the flanges. Such piling up of the tape has an adverse action upon unwinding the tape on the reel in a subsequent operation. In the past, no distributors have been known which have automatically variable throws so as to prevent piling up of tape near the flanges of the reel.

An object of the invention is to provide new and improved distributor mechanisms.

A further object of the invention is to provide new and improved variable throw distributors for winding tape and the like upon reels.

A distributor mechanism illustrative of the invention includes a tape guide, means for reciprocating the tape guide relative to a reel, and means for varying the length of throw of the tape guide.

A complete understanding of the invention may be obtained from the following detailed description of a distributor mechanism forming a specific embodiment thereof, when read in conjunction with the appended drawings, in which:

Fig. 4 is an enlarged, fragmentary, vertical section taken along line 4—4 of Fig. 3;

Fig. 5 is an enlarged, fragmentary, vertical section taken along line 5—5 of Fig. 3;

Fig. 6 is an enlarged, fragmentary, vertical section taken along line 6—6 of Fig. 5;

Fig. 7 is an enlarged, fragmentary elevation of a portion of the apparatus taken along line 7—7 of Fig. 3;

Fig. 8 is an enlarged, fragmentary view of a part of the apparatus showing portions thereof in section;

Fig. 9 is an enlarged, vertical section taken along line 9—9 of Fig. 8;

Fig. 10 is an enlarged, fragmentary, horizontal section taken along line 10—10 of Fig. 7;

Fig. 11 is an enlarged, front elevation of a portion of the apparatus;

Fig. 12 is an enlarged, side elevation of a portion of the apparatus;

Fig. 13 is an enlarged, fragmentary section taken along line 13—13 of Fig. 14, and Fig. 14 is an enlarged, fragmentary, vertical section taken along line 14—14 of Fig. 13.

Figure 1:
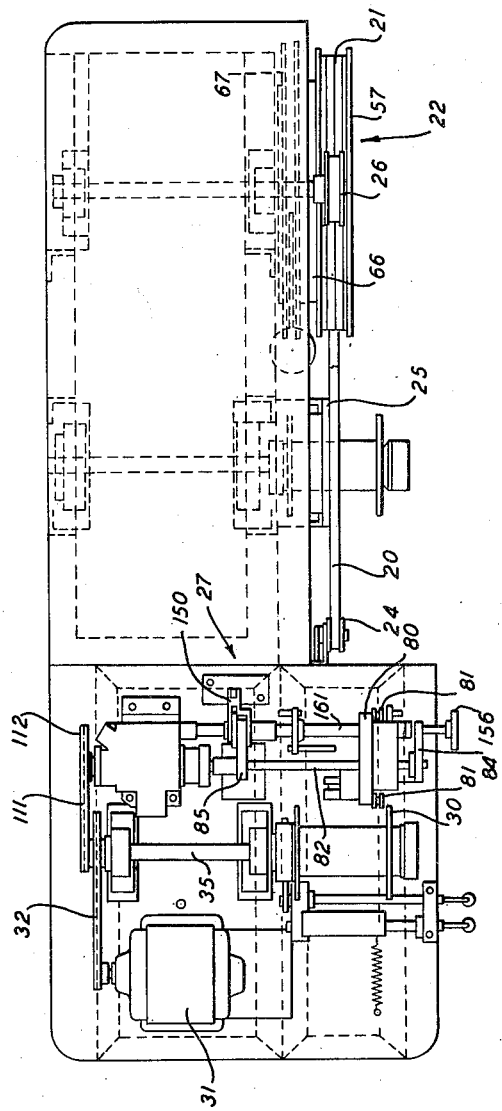
Fig. 1 is a top plan view of an apparatus including a distributor mechanism forming one embodiment of the invention.

Referring now in detail to the drawings, there is shown therein an apparatus for winding tapes on reels from pads of the tapes. This apparatus advances a tape 20 (Fig. 1) from a supply pad 21 mounted on a supply mechanism 22. The tape 20 is advanced over guide rolls 24—24 (Fig. 2), through a scraper 25, which cleans the tape, and over a guide roll 26. The tape is advanced from the guide roll 26 to a variable throw distributor 27 and thence to a driven reel 30, which draws the tape through the above-described apparatus. The reel 30 is driven by an electric motor 31 through transmission means including a chain 32 and an arbor 35 upon which the reel is mounted.

The pad 21 is mounted upon a drum 40 (Fig. 12) upon which it has been wound, and the drum 40 is mounted upon pins 41—41 of the supply mechanism 22. The pins 41—41 are fastened eccentrically to gears 42—42 (Figs. 13 and 14) and are movable by the gears 42—42 along arcuate slots 45—45 formed in reel head 46. The gears 42—42 are mounted on stub shafts 47—47, which project through holes 48—48 in the reel head 46 to prevent turning of the reel head 46 with respect to the gears 42—42. A gear 50 fastened rigidly to a hub 51 meshes with the gears 42—42. The hub 51 is mounted rotatably on a shaft 55 and is provided with a square tang 56 upon which a crank (not shown) having a square socket is designed to fit for rotating the hub 51 and the gear 50 relative to the shaft 55 and the reel head 46. A removable reel head 57 is splined to the hub 51, and is removably secured thereon by a nut 60. A ratchet 61 (Fig. 13) fastened rigidly to the hub 51 is designed to be locked against rotation by a pawl mechanism 62 mounted on the reel head 46. The pawl mechanism 62 serves to hold the ratchet 61, and thereby the hub, against rotation in a counterclockwise direction, as viewed in Fig. 13, but permits clockwise rotation of the ratchet 61 and the hub 51. When the pawl mechanism 62 is actuated, it releases the ratchet 61, and permits counterclockwise rotation thereof.

The stub shafts 47—47 are mounted in a spider 65, which is splined to the shaft 55. When the hub 56 is turned in a clockwise direction, as viewed in Fig. 13, it rotates the gears 42—42 in counterclockwise directions, which moves the pins 41—41 along the arcuate slots 45—45 in directions in which the pins 41—41 move outwardly with respect to the center of the reel head 46. The pins 41—41 firmly engage the drum 40 and hold the drum 40 and the pad 21 of the tape 20 against rotation relative to the reel head 46. In order to remove the drum 40 from the supply mechanism 22 when the supply pad 21 is exhausted, the reel head 57 is removed from the hub 51, the pawl mechanism 62 is actuated to release the ratchet 61 and the hub 51 is rotated in a counterclockwise direction, as viewed in Fig. 13. This moves the pins 41—41 inwardly with respect to the reel head 46 to release the drum 40, which is removed from the supply mechanism 22. Another pad and drum identical with the pad 21 and the drum 40, respectively, then may be mounted upon the supply mechanism 22.

A brake drum 66 (Fig. 14) secured rigidly to the reel head 46 serves to retard rotation of the reel head 46 when engaged by brake shoes 67—67. A compression spring 68 always presses the brake shoes against the drum 66, and a tension spring 69 (Fig. 2) augments the braking force of the compression spring 68 through a linkage system 70 when a solenoid 71 is not energized. The linkage system 70 is controlled by the solenoid 71, whose winding is in circuit with a control circuit (not shown) of the electric motor 31, and whenever the electric motor 31 is deenergized the solenoid 71 is deenergized to permit the spring-biased linkage system 70 to hold the brake shoes 67—67 into engagement with the brake drum 66 (Fig. 14) so that unwinding of the tape 20 from overrunning of the supply mechanism 22 is prevented. However, when the motor 31 is energized, the winding of the solenoid 71 is energized. This releases the braking effect of the tension spring 69 and the linkage system 70. However, a rod 72 may be slid freely to the right, as viewed in Fig. 11, relative to the right hand brake shoe so that energization of the solenoid does not affect the braking effect of the compression spring 68.

The variable throw distributor 27 (Fig. 3) includes a carriage 80 carrying guide pulleys 81—81 for guiding the tape 21 to the reel 30. The carriage 80 is mounted slidably on guide rods 82—82 extending parallel with the axis of the reel 30 and supported by brackets 84 and 85. The carriage 80 is provided with a threaded bore 86 (Fig. 5) for engaging a distributor screw 87, which is rotatably mounted in bearing portions 90—90 formed in the brackets 84 and 85. The distributor screw 87 is designed to move the carriage along the reel 30 in one direction when the distributor screw is rotated in one direction and to move the carriage 80 in the opposite direction when the distributor screw is rotated in the other direction.

The distributor screw 87 is provided with a shank portion 91 fastened by a coupling 92 to a shaft 95 (Fig. 9). A bevel gear 96 mounted rotatably with respect to the shaft 95 is provided with a clutch face 97, and meshes with a bevel gear 100 mounted on a freely rotatable stub shaft 101 and meshing with a bevel gear 106 having a clutch face 107 formed thereon. The bevel gear 106 is keyed to a shaft 110, which is driven through a chain 111 and a sprocket 112. The chain 111 is driven by a sprocket 113 (Fig. 3) fastened to the arbor 35 so that the shaft 110 is rotated at a rate of speed bearing a predetermined ratio to the rate of rotation of the arbor 35 and the reel 30 so that turns of the tape 21 on the reel 30 have uniform pitches.

A two-faced driven clutch member 115 is splined to the shaft 95 and may be slid along the shaft 95 by a yoke 116 mounted pivotally on a pin 117. A lug 120 formed on the yoke 116 is positioned between arms 121 and 122 of a clutch actuator 123 having lugs 125—125 depending therefrom. The lugs 125—125 straddle a reduced portion 126 of an actuating rod 127 between shoulders 130 and 131 of the actuating rod, which shoulders are spaced a predetermined distance apart. When the rod 127 is moved to the left, as viewed in Fig. 9, a shoulder 131 engages the lugs 125—125 and moves the actuator 123 in a clockwise direction. The actuator 123 is provided with an arm 135 carrying a follower roll 136. In the position of the actuator 123, as shown in Fig. 9, the shoulder 131 of the actuator rod 127 has engaged the arms 125—125 with the actuator 123, and has moved the follower roll 136 over the crest of a spring-pressed overcenter pusher latch 137, which then rapidly urges the actuator 123 further in a clockwise direction and moves the arm 121 against the lug 120. The pusher latch 137 continues to move the actuator 123 rapidly in a clockwise direction, and the arm 121 through the lug 120 of the yoke 116 and the yoke 116 moves the clutch member 115 out of driving engagement with the bevel gear 96 and into engagement with the bevel gear 106. The bevel gear 96 then rotates freely and does not drive the shaft 95, which is driven directly through the driven clutch member 115 by the bevel gear 106. This reverses the direction of rotation of the shaft 95 and the distributor screw 87 (Fig. 10), which reverses the direction of the carriage 80 and moves it relative to the reel 30 toward the right, as viewed in Fig. 3.

Figure 3:
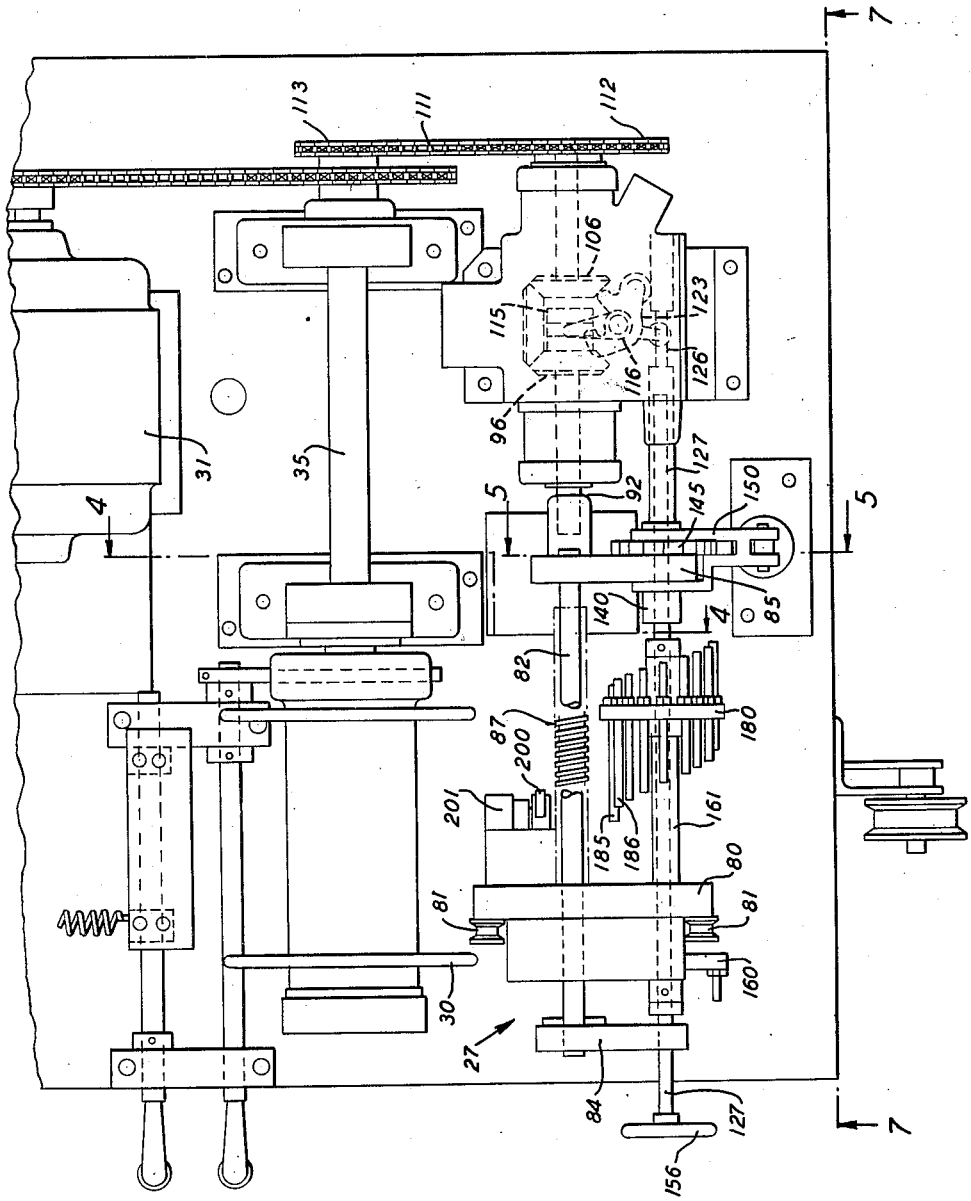
Fig. 3 is an enlarged, fragmentary, top plan view of the apparatus.

When the actuator rod 127 is moved to the right, as viewed in Fig. 9, the shoulder 130 engages the lugs 125—125 of the actuator 123 and turns the actuator 123 in a counterclockwise direction until the follower roll 135 is moved over the crest of the pusher latch 137. The pusher latch 137 then forces the actuator 123 further in a counterclockwise direction and the arm 122 pushes the lug 120 to the left, which moves the clutch member 115 out of engagement with the bevel gear 106 and into engagement with the bevel gear 96, which again reverses the direction of rotation of the shaft 95 and the distributor screw 87 (Fig. 3). This reverses the direction of the carriage 80 relative to the reel 30 so that the carriage moves to the left, as viewed in Fig. 3. The action of the pusher latch is to snap the clutch member from engagement with one of the bevel gears 96 and 106 and to engagement with the other of these gears.

An elongated collar 140 (Fig. 10) pinned to the actuating rod 127 is mounted slidably and rotatably in a bore 141 formed in the bracket 85. A ratchet 145 splined to the collar 140 is provided with teeth 147. A suitable pawl mechanism 150 mounted pivotally upon the collar 140 includes a pawl 146 for engaging the ratchet teeth 147—147, and includes a holding pawl 148 operable to limit the rotation of the ratchet to the angle between alternate teeth of the ratchet at each actuation of the pawl mechanism 150.

The left end of the actuator rod 127, as viewed in Fig. 10, is mounted slidably in a bore 155 formed in the bracket 84, and a knob 156 is mounted rigidly thereon. A disc 160 screwed on the left end of a sleeve 161 is secured against longitudinal or turning movement with respect to the actuator rod 127 by a pin 162. Follower rods, illustrated by follower rods 165 and 166, are spaced equidistantly around the disc 160, and are mounted adjustably in tapped bores, illustrated by a tapped bore 167. Nuts 170—170 threaded on the follower rods 165 and 166 serve to hold these follower rods in their adjusted positions relative to the discs 160. The distances which these follower rods project to the right, as viewed in Fig. 10, from the disc 160, are unequal. The follower rod 165 is positioned in alignment with a lug 171 when in the position in which it is shown in Fig. 10. When the distributor screw moves the carriage 80 to the left, the lug 171 engages the follower rod 165 and moves the follower rod 165, the disc 160 and the actuator rod 127 to the left to reverse the direction of rotation of the distributor screw 87 in the manner described hereinabove when the carriage is in a predetermined position with respect to the reel 30.

A disc 180 threaded on the sleeve 161 is secured rigidly to the actuator rod 127 by a pin 182. Follower rods, illustrated by follower rods 185 and 186 threaded into tapped bores illustrated by tapped bores 187 and 188 formed in the disc 180, are secured by nuts 190—190 in positions in which each of these follower rods projects a different predetermined distance to the left, as viewed in Fig. 10, from the disc 180. For example, the follower rod 185 projects much farther to the left than the follower rod 186. Each of the follower rods mounted on the disc 180 is aligned with one of the follower rods mounted on the disc 160. For example, the follower rod 185 is aligned with the follower rod 165 and the follower rod 186 is aligned with the follower rod 166. Each of the follower rods is secured adjustably so that the distance it projects from the disc on which it is mounted may be varied.

After the lug 171 has struck the follower rod 165 to reverse the direction of rotation of the distributor screw 87 as described hereinabove, the carriage 80 is moved by the distributor screw 87 toward the right, as viewed in Fig. 10. This movement continues and during the movement an actuating arm 195, which is carried pivotally on the carriage 80 by a bolt 196 and is held against pivotal movement in one direction only by a stop 197, engages a switch arm 200 of a switch 201 and actuates the switch 201. This actuation of the switch 201 energizes a solenoid 205 (Fig. 4) and the pawl mechanism 150 is turned in counterclockwise direction, as viewed in Fig. 4, against the action of a spring 206. This turns the actuator rod 127 through the collar 140 through an angle in which the follower rod 185 (Fig. 10) is moved out of the path of the lug 171 and the follower rod 186, which is immediately adjacent to the follower rod 185, is moved into the path of the lug 171. This operation of the pawl mechanism 150 also moves the follower rod 166 (Fig. 10), which is next to the follower rod 165, into the path of the lug 171.

The disc 180 is provided with a plurality of sockets 210—210 (Fig. 6) equal in number to the follower rods carried by the disc for partially receiving a ball detent 211, which is urged into the socket 210 opposite thereto by a compression spring 212 to hold the disc 180 and hence, the sleeve 161 and the disc 160 against accidental rotation after the discs 180—180 have been located in a position in which one of the follower rods of each is in the path of the lug 171. The latching pawl 148 also prevents accidental rotation of the discs 180—180. However, the sockets 210—210 are shallow enough and the compression spring 212 is weak enough that rotation of the disc 180 is not prevented when the pawl mechanism 150 (Fig. 4) is actuated.

A latching arm 213 having a bearing portion 214 rotatable on the actuator rod 127 and held between the disc 180 and a collar 217, which is fastened against longitudinal movement relative to the rod 127, carries the ball detent 211 and the compression spring 212 in a bore 218 formed therein. A key 219 projecting into a keyway 220 in the arm 213 permits sliding of the arm but prevents pivotal movement thereof. The follower rod 166 projects a different distance from the disc 160 than the follower rod 165, and the follower rod 186 projects a different distance from the disc 180 than the follower rod 185.

Figure 2:
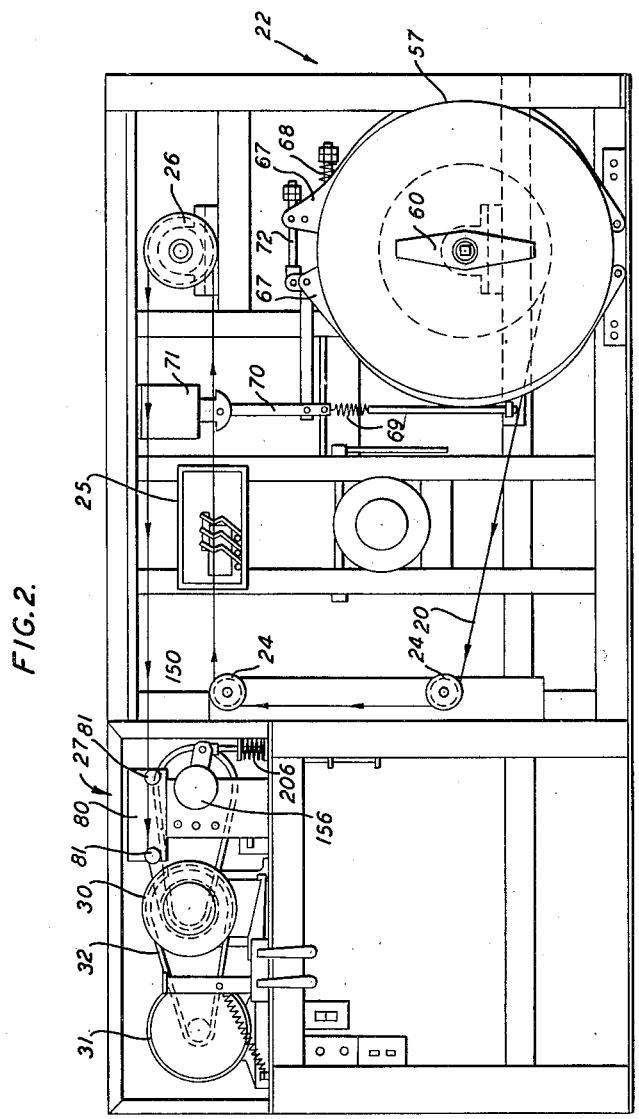
Fig. 2 is a front elevation of the apparatus shown in Fig. 1.

The carriage 80 continues to move to the right, as viewed in Fig. 10, after the switch 201 has been actuated, and the lug 171 pushes the follower rod 186 to reverse the direction of the distributor screw 87 when the carriage 80 is in a predetermined position with respect to the reel 30 (Fig. 1). The carriage 80 then is moved to the left, as viewed in Fig. 10, and distributes the tape 20 in a new layer upon the reel 30. As the carriage moves to the left, the actuating arm 195 engages switch arm 200 but merely rides over the switch arm without moving it. Hence, the pawl mechanism 150 is not actuated on the return stroke of the carriage 80.

The lug 171 pushes the follower rod 166 to reverse the direction of rotation of the distributor screw 87 when the carriage 80 is in a predetermined position with respect to the reel 30 (Fig. 1). This position of the carriage 80 is farther to the left, as viewed in Fig. 10, than the position of the carriage 80 when it was reversed by the follower rod 165. Hence, the left ends of the layers of the tape 20 formed in the individual reversing actions of the follower rods 165 and 166 are spaced lengthwise along the reel from each other. The above-described procedure is repeated with follower rods 215 and 216, which are next moved into the path of the lug 71, and then sequentially with the other successive follower rods on the discs 160 and 180.

Hence, the length of throw of the distributor 27 is automatically varied at each reciprocation thereof so that each layer of the tape 20 wound on the reel 30 is displaced laterally from the layer below it, which displacement prevents piling up of the tape adjacent to the flanges of the reel and keeps the tape level on the reel. The lengths of the follower rods, illustrated by the follower rods 165, 166, 185, 186, 215 and 216, are such that the ends of the layers of the tape 20 wound upon the reel 21 vary substantially from the center of the reel 30 to the flanges thereof and the positions of the layers of the tape 20 vary in accordance with a predetermined pattern. The ends of adjacent layers of the tape are always staggered with the particular adjustment of the follower rods shown, although they could be adjusted so that not all the ends would be staggered.

*Operation*

In the operation of the apparatus described hereinabove, the tape 20 is guided to the reel 30 by the pulleys 81—81 of the distributor 27. The carriage 80 is reciprocated between the particular follower rods lying in the path of the lug 171, and in the intermediate portion of the stroke of the carriage to the right, as viewed in Fig. 7, the actuating arm 195 moves the switch arm 200 to actuate the switch 201. This actuates the solenoid 205 and the pawl mechanism 150 is operated to rotate the rod 127 and the discs 160 and 180 to positions in which the follower rods 166 and 186 are in path of the lug 171 (Fig. 10). The follower rod 166 projects a different distance from the disc 160 than does the follower rod 165, and the follower rod 186 projects a different distance from the disc 180 than does the follower rod 185. Hence, the ends of the stroke of the carriage 80 will be shifted longitudinally with respect to the reel 30 (Fig. 3) and the tape 20 distributed upon the reel 30 by the carriage 80 and the guide pulleys 81—81 will be wound upon the reel in staggered layers. After each full reciprocation of the carriage 80, the pawl mechanism 150 is acuated again and a new pair of follower rods is moved into the path of the lug 171. Consequently, the tape 20 is wound upon the reel 30 in layers whose ends are determined by the lengths of the particular follower rods mounted on the discs 160 and 180, and piling up of the tape 20 at any point on the reel 30 is prevented.

The knob 156 may be used to slide the actuator rod 127 manually to selectively reverse the direction of movement of the carriage 80 at any desired point on the path thereof. The actuator rod 127 also may be rotated manually through the knob 156 to selectively skip any desired number of pairs of opposed follower rods and thereby vary the normal predetermined pattern of the layers of the tape 20 on the reel 30.

The above-described apparatus serves to wind the tape 20 on the reel 30 in layers whose ends are spaced in a pattern between the central portion of the reel to the flanges thereof. The distributor mechanism is operated automatically and effectively serves to prevent piling up of the tape 20 on the reel 30 at any point between the flanges of the reel. Hence, fouling of the tape 20, which might be caused if the tape were piled up at any point on the reel 30 is prevented.

While the apparatus described hereinabove is designed to feed tape to a reel, it is obivous that cords, ribbons, strands, or the like, all of which fall within the term "filamentary material," may be wound on reels with apparatus embodying the invention. Hence, terms, such as "filament" and "filamentary article," and terms of similar import, as used in the annexed claims, are intended to include strands, cords, insulated conductors, cables, tapes, ribbons and other elongated articles of similar shape.

What is claimed is:

1. In a winding apparatus including a takeup reel and means for rotating the reel to wind a filament thereon, the combination of a distributor head for guiding a filament to the reel, reversible means for moving the distributor head parallel to the reel, means for reversing the head moving means, a slidably mounted actuating rod associated with the reversing means, a lug carried by the distributor head, a pair of spaced, aligned followers carried adjustably by the actuating rod in positions offset from the longitudinal axis of the actuating rod, a second pair of spaced, aligned followers carried by the actuating rod in positions spaced angularly from the first-mentioned pair of followers, and means for sequentially moving each of said pairs of followers into positions lying in the path of the lug.

2. In a winding apparatus including a takeup reel for winding a filament thereon and means for rotating the takeup reel, a distributor mechanism which comprises a distributor screw extending parallel to the takeup reel, a distributor head associated with and movable by the distributor screw, reversible driving means for rotating the distributor screw, means including a movable rod for reversing the reversible driving means to cause the distributor screw to be rotated in one direction when the rod is moved in a given direction and for causing the rotation of the distributor screw to be reversed when the rod is moved in the opposite direction, whereby the distributor head may be caused to reciprocate, a pair of spaced, aligned actuators carried by the rod, a second pair of spaced, aligned actuators carried by the rod, said second pair of spaced actuators being spaced at points along the rod different from those at which the first-mentioned pair of actuators are spaced, a lug carried by the distributor head, and means for selectively moving the pairs of actuators into positions where they may be engaged by the lug when the distributor head is reciprocated.

3. In a winding apparatus including a takeup reel for winding a filament thereon and means for rotating the takeup reel, a distributor mechanism which comprises a distributor head, means for reciprocating the distribtuor head including a reversible driving means, means including a movable rod for actuating the reversible driving means to move the head in one direction when the rod is moved in a given direction and for actuating the reversible driving means to move the head in the opposite direction when the rod is moved in a direction opposite to the first-mentioned direction of movement of the rod, a pair of spaced, aligned actuators carried adjustably by the rod and being positioned in a plane radial with respect to the rod, a second pair of spaced, aligned actuators carried adjustably by the rod and positioned at different points along the rod than the points at which the first-mentioned pair of actuators are positioned, said second pair of actuators being positioned in a second plane radial with respect to the rod, a member carried by the distributor head along a predetermined path, means for sequentially rotating the rod to sequentially move the pairs of actuators into positions in the path of the member, and means for automatically actuating the rod-rotating means.

4. In a winding apparatus including a takeup reel and means for rotating the takeup reel to wind a tape upon the takeup reel, a distributor mechanism which comprises reversible distributing means, means including an actuating rod for causing the reversible distributing means to reverse directions from one direction to the opposite direction when the rod is moved in one direction and for causing the reversible distributing means to reverse from the second-mentioned direction to the first-mentioned direction when the actuating rod is moved in a direction opposite to its first-mentioned direction, a pair of opposed abutments carried rigidly by the actuating rod at predetermined points thereon, said abutments being positioned laterally with respect to the actuating rod, a second pair of opposed abutments carried rigidly by the actuating rod at predetermined points with respect thereto, said last-mentioned pair of abutments being positioned at different points along the actuating rod and laterally from the positions of the first-mentioned pair of opposed abutments and laterally relative to the actuating rod, an actuator movable in accordance with movement of the distributing means, and means for automatically and sequentially rotating the pairs of abutments into positions in which the abutments bracket the actuator.

5. In a winding apparatus including a takeup reel and means for rotating the takeup reel to wind a tape upon the takeup reel, a distributor mechanism which comprises a distributor head for guiding a tape to the takeup reel, a distributor screw for moving the distributor head in one linear direction when rotated in one direction and for moving the distributor head in the opposite linear direction when rotated in the other direction, a differential mechanism including a control arm movable between two positions, said differential mechanism serving to rotate the distributor screw in one direction when the control arm is in one position and to rotate the distributor screw in the opposite direction when the control arm is in the other position, quick-acting means for moving the control arm from either of said positions to the other position, means including an actuating member for actuating the arm-actuating means to move the control arm to one of said positions when the actuating member is moved in one direction and for actuating the arm-actuating means to move the control arm to the other position when the actuating member is moved in the other direction, a pair of opposed abutments carried rigidly by the actuating member at predetermined points thereon, each of said abutments being individually adjustable with respect to the actuating member, a second pair of opposed abutments carried rigidly by the actuating member in predetermined positions with respect thereto, each of said last-mentioned abutments being individually adjustable with respect to the actuating member, said last-mentioned pair of abutments being positioned at different points along the actuating member from the points at which the first-mentioned pair of opposed abutments are positioned, an actuator movable in accordance with the movement of the distributor head, and means for automatically and sequentially bracketing the actuator with the pairs of spaced abutments.

6. In a winding apparatus including a takeup reel and means for rotating the takeup reel to wind a tape upon the takeup reel, a distributing device which comprises a reversible distributor, means including an actuating rod for reversing the distributor from movement in one direction to movement in the opposite direction when the rod is moved in one direction and for reversing the distributor from movement in said opposite direction to movement in the first-mentioned direction when the rod is moved in a direction opposite to its first-mentioned direction, a pair of widely spaced discs mounted rigidly on the rod, a group of follower rods mounted adjustably on and projecting different predetermined distances from one of the discs toward the other disc, said follower rods being paralled to the actuating rod, a second group of follower rods mounted adjustably on and projecting different predetermined distances from the last-mentioned disc, each of said last-mentioned follower rods being aligned with one of the first-mentioned follower rods, an actuator carried by the distributor and positioned between an aligned pair of the follower rods, means for rotating the rod through a predetermined angle to move a second aligned pair of the follower rods into alignment with the actuator, means for actuating the rod rotating means, and means carried by the distributor for actuating the actuating means during one stroke of each reciprocation of the distributor.

7. In a winding apparatus including a takeup reel and means for rotating a takeup reel to wind a tape upon the takeup reel, a distributing device which comprises a distributing screw, a distributor head movable by the distributor screw for guiding a tape to the takeup reel, a reversible drive for driving the distributor screw, means including an actuating rod for causing the driving means to rotate the distributor screw in one direction when the rod is moved in one direction and for causing the driving means to rotate the distributor screw in the opposite direction when the rod is moved in the opposite direction, a pair of widely spaced discs mounted rigidly on the rod, a plurality of follower rods of different predetermined lengths carried by one of the discs in positions in which the follower rods extend parallel to the actuating rod, a second group of actuating rods of different lengths carried by the second disc in positions aligned with the first-mentioned follower rods, an actuator carried by the distributing head and positioned between an opposed pair of follower rods, a ratchet mechanism for rotating the rod to move a second opposed pair of the follower rods into alignment with the actuator, a solenoid including a winding for actuating the ratchet mechanism, a switch for causing energization of the solenoid winding, and one-way means carried by the distributor head for actuating the switch during one stroke of a reciprocation of the distributor head.

8. In a winding apparatus including a takeup reel and means for rotating a takeup reel to wind a tape upon the takeup reel, a distributing device which comprises a distributing screw, a distributor head movable relative to the takeup reel by the distributor screw for guiding a tape to the takeup reel, a reversible drive for rotating the distributor screw, reversing means including an actuating rod for causing the reversible drive to rotate the distributor screw in one direction when the actuating rod is moved in one direction and for causing the reversible drive to rotate the distributor screw in a direction opposite to its first-mentioned direction when the actuating rod is moved in a direction opposite to its first-mentioned direction, said reversing means being operable when the actuating rod is moved in the same direction as that in which the distributor head is being moved in any particular instance, a pair of widely spaced discs mounted rigidly on the actuating rod, a group of follower rods carried by and projecting different predetermined distances from one of the discs, said follower rods projecting toward the other disc in directions parallel to the actuating rod and being positioned around the actuating rod, a second group of follower rods carried by the last-mentioned disc in positions projecting toward the other disc, each of said last mentioned follower rods being aligned with one of the first-mentioned follower rods and projecting different predetermined distances toward the first-mentioned disc to form therewith a pair of aligned follower rods, an actuator carried by the distributing head, and a step-by-step mechanism operable during each reciprocation of the distributor head for rotating the actuating rod to sequentially move the opposed aligned pairs of the follower rods into positions bracketing the actuator.

9. In a winding apparatus including a takeup reel and means for rotating the reel to wind a filament thereon, the improvement which comprises a distributor head for guiding the filament to the reel, reversible means for moving the distributor head parallel to the reel, means for reversing the head-moving means, a lug carried by the distributor head, an actuator associated with the reversing means and mounted movably with respect thereto, a pair of spaced aligned followers carried by the actuator, a second pair of spaced aligned followers carried by the actuator and spaced from the first-mentioned pair of followers, and means for sequentially moving each of the said pairs of followers into positions bracketing the lug.

10. In a winding apparatus including a takeup reel for winding a filament thereon and means for rotating the takeup reel, the improvement which comprises a distributor head, means including a reversible driving means for traversing the distributor head with respect to the reel, an actuator for reversing the reversible driving means to move the head in one direction when the actuator is moved in a given direction and for reversing the reversible driving means to move the head in a direction opposite to the first-mentioned direction of the head when the actuator is moved in a direction opposite to the first-mentioned direction of movement of the actuator, a pair of spaced aligned abutments carried by the actuator, a second pair of spaced aligned abutments carried by the actuator and positioned at different points along the actuator than the points at which the first-mentioned pair of abutments are positioned, said second pair of abutments being offset from the first-mentioned pair of abutments, a member carried by the distributor head along a predetermined path, means for moving the pairs of abutments sequentially into positions in the path of the member, and means for actuating automatically the abutment-moving means.

11. In a winding apparatus including a takeup reel for winding a filament thereon and means for rotating the takeup reel, the improvement which comprises a distributor head, a reversible driving means for traversing the distributor head, a reverser for reversing the reversible driving means to cause the distributor head to be moved in one direction when the reverser is moved in a given direction and for causing the reversible driving means to move the distributor head in the opposite direction when the reversible head is moved in a direction opposite to the first-mentioned direction thereof, whereby the distributor head is caused to reciprocate with respect to the takeup reel, a pair of spaced aligned actuators carried by the reverser, a second pair of spaced aligned actuators carried by the reverser at points spaced along the reverser different from those at which the first mentioned pair of actuators are spaced and offset therefrom, a striker carried by the distributor head, and means for moving the pairs of actuators selectively into positions where they may be moved by the striker when the distributor head is traversed reversibly.

12. In a winding apparatus including a takeup reel and means for rotating the takeup reel to wind a filament on the takeup reel, the improvement which comprises reversible distributing means, means including an elongated actuator for actuating the reversible distributing means to reverse the movement of the distributing means from one direction to the opposite direction when the actuator is moved in one direction and for actuating the reversible distributing means from movement in the last-mentioned direction thereof to the movement in the first-mentioned direction thereof when the actuator is moved into a direction opposite to the first-mentioned direction thereof, a pair of opposed abutments carried by the actuator at two predetermined points therealong, a second pair of opposed abutments carried by the actuator at two predetermined points therealong and offset laterally from the positions of the first-mentioned pair of opposed abutments, a member movable in accordance with movement of the distributor head, and means for moving the pairs of abutments automatically and sequentially into positions in which the abutments bracket the member carried by the reversible distributing means.

OSCAR G. NELSON.
PAUL R. POWELL.

REFERENCES CITED

The following references are of record in the file of this patent:

UNITED STATES PATENTS

| Number | Name | Date |
|---|---|---|
| 1,964,946 | Helgason et al. | July 3, 1934 |
| 2,238,128 | Nydegger | Apr. 15, 1941 |
| 2,254,220 | Hubbard | Sept. 2, 1941 |
| 2,306,045 | Delano | Dec. 22, 1942 |